Feb. 5, 1935.   V. G. APPLE ET AL   1,990,447
VARIABLE RESISTOR
Original Filed Jan. 16, 1930
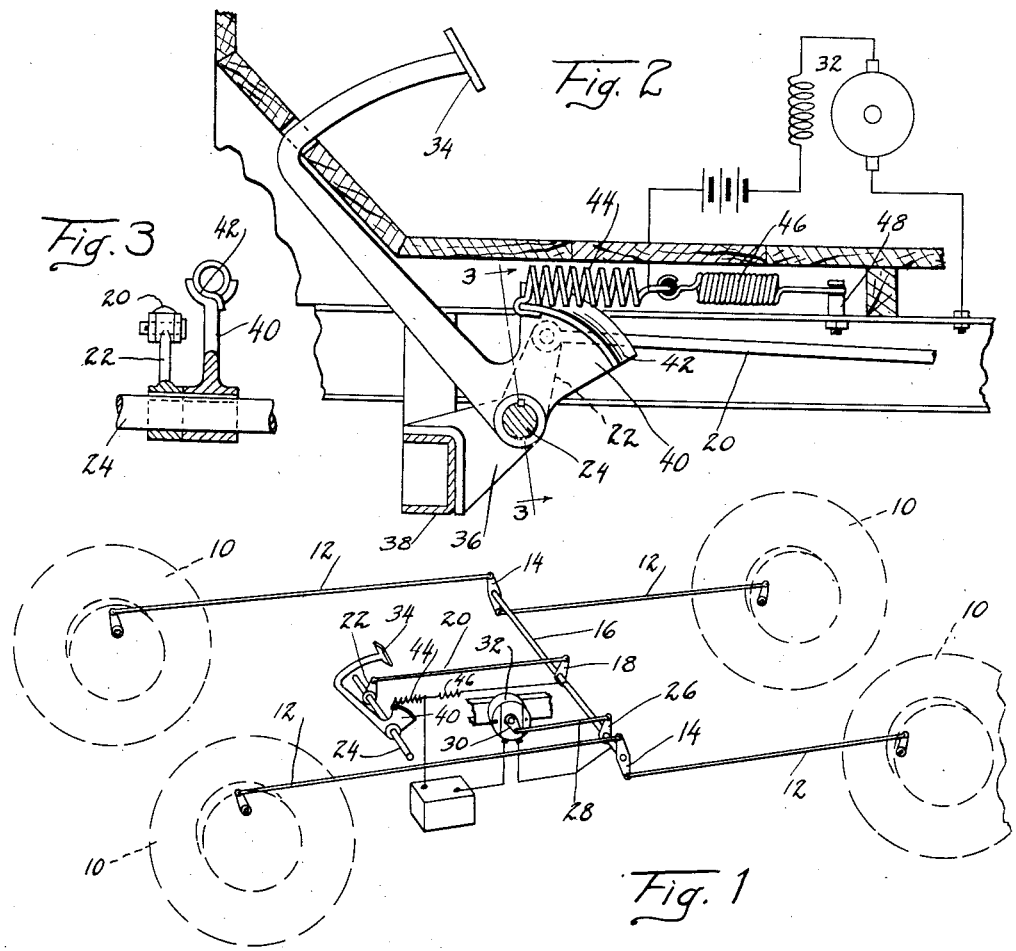
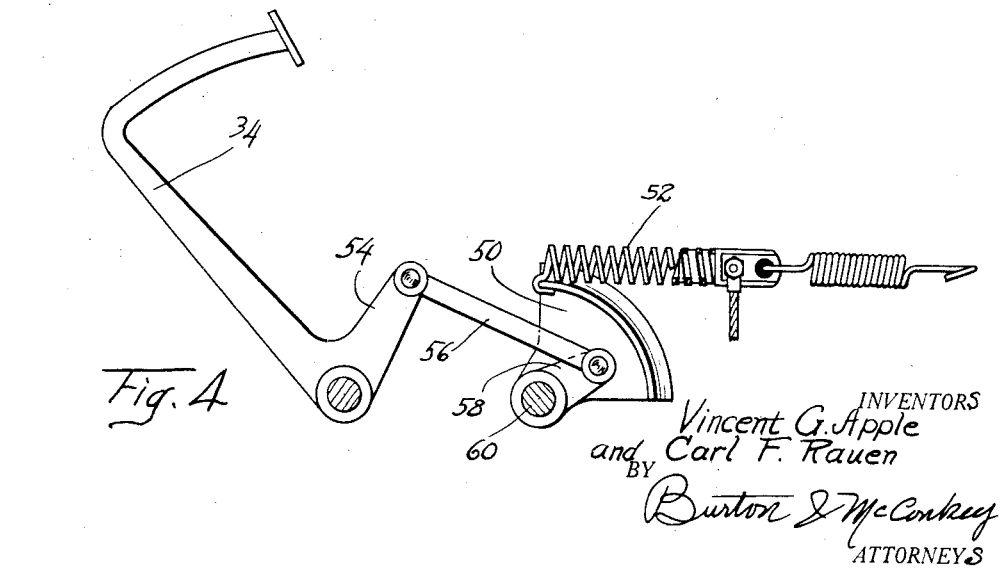
INVENTORS
Vincent G. Apple
and Carl F. Rauen
BY
Burton & McConkey
ATTORNEYS Patented Feb. 5, 1935

1,990,447

UNITED STATES PATENT OFFICE

1,990,447

VARIABLE RESISTOR

Vincent G. Apple and Carl F. Rauen, Dayton, Ohio, assignors to Bendix Brake Company, South Bend, Ind., a corporation of Illinois Application January 16, 1930, Serial No. 421,329
Renewed October 12, 1934

12 Claims. (Cl. 201—56)

Our invention relates to a rheostat, or variable resistor element, and has particular reference to one designed for use in conjunction with a system of electric brakes.

An object of our invention is to simplify the control means for varying the current strength of an electric brake circuit. Where electric power is utilized to apply automotive vehicle brakes it is quite customary to include in the circuit a variable resistor wherein the resistance is decreased as greater effort is applied to the brake pedal. Resistor elements have usually comprised a relatively large, bulky unit which occupied considerable space and which rendered the control mechanism in its entirety quite expensive.

In obtaining the above specified object we have made use of the brake pedal itself, so forming the stem end of the said brake pedal that it may be used without additional mechanism as a part of the circuit and so connected to a resistance element that the resistance of the element is decreased as the brake pedal is depressed by the vehicle operator.

Other meritorious features of our invention will become apparent from the following description taken in conjunction with the following drawing wherein like numerals refer to like parts and wherein:

Fig. 1 is a diagrammatic sketch of our resistor unit as placed in circuit with a system of electric brakes, Fig. 2 is a sectional elevation of the brake pedal stem and resistor element, including diagrammatically an electric circuit for operating the brakes, Fig. 3 is a sectional view along the line 3—3 of Fig. 2, and Fig. 4 is a sectional elevation of a somewhat modified form of my resistor element.

In our diagrammatic sketch (Fig. 1) the brake shoes on each of the four wheels 10 are connected up in any well known fashion by the rods 12 to the arms 14 of the rotatable brake shaft 16. A third arm 18 is secured to the shaft 16 and is connected through the link 20 to an arm 22 secured to the brake pedal shaft 24. A fourth arm 26 is secured to the shaft 16 and this is connected up through the link 28 with an arm 30 fastened to the armature shaft of an electric motor 32. This electric motor is secured to the frame of the chassis in any convenient manner. It is obvious that upon rotation of the electric motor when the circuit therethrough is closed, the arm will be rotated and, through the linkage hereof described, will assist in applying power to the brakes.

The brake pedal 34 is splined to the shaft 24, which shaft is journalled in a bracket 36 which is secured to the cross frame 38 of the vehicle. The base extremity of the brake pedal stem is provided with an angularly extending segmental section 40, the periphery of which is grooved as at 42 to provide a seat for the coil spring 44.

This coil spring 44 is composed of resistance wire and one extremity thereof is secured to one edge of the groove 42, as indicated in Figs. 2 and 3. The spring extends away in tangential relation to the periphery of segment 40 and at its other extremity is secured by means of an insulated connection to a second coil spring 46. The other extremity of this second coil spring is secured to some fixed member on the chassis as by the stud 48.

Electric connections extend, as clearly illustrated in Figs. 1 and 2, from one extremity of the coil spring 44 to the storage battery and from the storage battery on through electric motor 32, from which it is grounded on some convenient portion of the chassis. The circuit is shorted from whatever portion of spring 44 contacts the peripheral groove as a seat down through the segment 40 and is then grounded through the bracket 36 and chassis frame 38.

It will be obvious from a brief survey of the drawing that as the brake pedal 34 is depressed, an increasingly large portion of the spring 44, which constitutes our resistance element, will be shortcircuited, and that conversely, a decreasing resistance will be included in the circuit through the electric motor 32 which functions to apply the brakes.

In Fig. 4 we have modified the construction illustrated in Figs. 1 and 2 somewhat in that our segmental member 50 which provides a seat for the resistance coil 52 is pivoted about a shaft spaced from that on which the brake pedal 34 is mounted. An arm 54 on the base extremity of the brake pedal is connected by the link 56 to an arm 58 which is secured to the shaft 60, upon which latter shaft the segment 50 is secured. In this way we have provided a somewhat stepped up movement of the segment 50 with relation to the arm 54 of the brake pedal. By virtue of the difference in length in the arms 54 and 58 the latter arm will travel through a greater arc than the former during any predetermined movement of the brake pedal 34 and thus decrease the resistance in the brake circuit more rapidly than in the modification disclosed in the other figures.

It is to be noted that our resistance element may serve the dual function of varying the resistance in circuit while serving as a retraction spring for the brake pedal.

Various modifications of our device will become apparent to those skilled in the art and for that reason we intend to limit ourselves only within the scope of the appended claims.

We claim

1. A variable resistor for an electric circuit comprising a pivoted control member, a segmental member having an outer peripheral electrical conductive groove and constrained by said member to rotate about a point in unison with the movement of the member about its pivot, and a coil spring forming a resistance element in an electric circuit having its free end secured to said segment in tangential relation to the periphery thereof and adapted to seat within said groove on rotation of the segment.

2. A variable resistor for an electric circuit comprising a pivoted control member, a segmental member constrained thereby to rotate about a point in unison with the movement of the member about its pivot and having a conductive outer peripheral groove, a coil spring forming a resistance element in an electric circuit having its free end secured to said segment in tangential relation to the periphery thereof and adapted to seat within said groove on rotation of the segment, and a ground connection through said segment.

3. Control means for an electric circuit comprising a pivoted control member, a pivoted segmental member having a conductive peripheral groove and constrained to rotate in unison with movement of said member, a coil spring of electrical resistance material secured to one end of said segmental member in tangential relation thereto and adapted to seat within the groove upon rotation of the segment, and means connected to and insulated from said coil spring for retaining the same in one extreme position.

4. A variable resistor for an electrical circuit comprising, in combination, a member having an arcuate conductive groove, a coil spring of electrical resistance material having its free end secured to one end of the groove for resiliently maintaining the member in one position, an electric circuit including the spring and member, and control means for moving said member against the tension of the spring whereby an increasing number of turns of the coil spring are seated within the walls of the groove to decrease the resistance of the circuit.

5. A variable resistor for an electric circuit comprising, in combination, a member having an arcuate electrical conductive channel on its surface, a coil spring composed of electrical resistant material and tangentially secured to one end of the groove for resiliently maintaining the member in one position, an electric circuit including the member and spring, and means for moving said member against the tension of the spring to bring the walls of the arcuate channel into contact with an increasing number of turns of the coil spring whereby the resistance of the circuit is varied.

6. A variable resistor for an electric circuit comprising a coil spring composed of electrical resistance material, a control member yieldingly maintained in one position by said spring, an electric circuit including the spring and the member, and an arcuate electrical conductive groove in said control member adapted to seat greater portions of the coil spring within the groove as the spring is tensioned by movement of the control member whereby the resistance of the circuit is varied.

7. A variable resistor for an electric circuit comprising a control member having a coil spring of electrical resistance material yieldingly maintaining the control member in one position, an electric circuit including said spring and member, and an arcuate groove of electrical conductive material and on said control member swingable in response to movement thereof to bring greater number of turns of the coil spring into engagement with the walls of the groove thereby gradually decreasing the resistance of the circuit.

8. A variable resistor for an electric circuit comprising a control member, a pivoted arcuate member constrained to rotate about its pivot in accordance with the movement of the control member, a coil spring composed of electrical resistance material having its free end tangentially secured to the periphery of the arcuate member, an electric circuit established through the coil spring and the arcuate member, and a peripheral groove on the arcuate member adapted to engage greater portions of the coil spring as the latter is tensioned by the rotation of the arcuate member.

9. A variable resistor for an electric circuit comprising a control member, an arcuate member constrained thereby to rotate about a point in unison with the movement of the control member, a coil spring of electrical conductive material and tangentially secured to the periphery of the arcuate member and resiliently maintaining the control and arcuate members in one position, an electric circuit including the coil spring and the arcuate member, and a peripheral channel of electrical conductive material on said arcuate member conforming to the size of the coil spring and adapted to seat greater portions of the coil spring as the latter is stretched by movement of the control member whereby the resistance of the electric circuit is varied.

10. A variable resistor for an electric circuit comprising a pivoted control member, a coil spring resiliently maintaining the control member in one position and forming a resistance element in an electric circuit, an arcuate member constrained to rotate about a point in unison with the movement of the control member about its pivot, and an electrical conductive outer peripheral groove on said arcuate member adapted to engage greater portions of the spring as the latter is tensioned by movement of the control member whereby the resistance of the electric circuit is varied.

11. A variable resistor for an electric circuit comprising, in combination, a pivoted electrical conductive member, a pair of springs insulatively coupled in series having one end fixed and the other end secured to said member yieldingly restraining the same in one position of its pivotal movement, one of said springs comprising electrical resistance material, an electric circuit including said member and said spring of electrical resistance material, said member adapted upon pivotal movement to gradually engage greater portions of the spring through which the circuit is established and vary the resistance in the circuit.

12. A variable resistor for an electric circuit comprising, in combination, a pivotal member having an electrical conductive surface, a control member connected to said pivotal member through power varying leverage so as to cause the pivotal member to move at a different rate from that of the control member, a spring of electrical resistance material forming a tension mechanism yieldingly restraining both said members in one position of their movement, a circuit including said spring and the electrical conductive surface of said pivotal member, said spring adapted to engage greater portions of said surface of the pivoted member as the latter is pivoted by the control member whereby the resistance in the electric circuit is varied.

VINCENT G. APPLE.
CARL F. RAUEN.

CERTIFICATE OF CORRECTION.

Patent No. 1,990,447.　　　　　　　　　　　　　　　　　February 5, 1935.

VINCENT G. APPLE, ET AL.

It is hereby certified that error appears in the printed specification of the above numbered patent requiring correction as follows: Page 2, second column, line 10, claim 7, strike out the word "and"; line 25, claim 8, after "member" insert the words lined with electrical conductive material and; line 33, claim 9, for "conductive" read resistance; and line 34, same claim, strike out the word "and"; and that the said Letters Patent should be read with these corrections therein that the same may conform to the record of the case in the Patent Office.

Signed and sealed this 19th day of November, A. D. 1935.

(Seal)

Leslie Frazer
Acting Commissioner of Patents.